(12) United States Patent
Wood et al.

(10) Patent No.: US 8,543,269 B1
(45) Date of Patent: Sep. 24, 2013

(54) DIGITAL MAPPING DISPLAY FUNCTIONS FOR A GPS/SONAR UNIT

(75) Inventors: Michael Wesley Wood, Cushing, MN (US); Jeffrey Earl Smith, Farmington, MN (US)

(73) Assignee: Johnson Outdoors Marine Electronics, Inc., Eufaula, AL (US)

( * ) Notice: Subject to any disclaimer, the term of this patent is extended or adjusted under 35 U.S.C. 154(b) by 144 days.

(21) Appl. No.: 13/110,587

(22) Filed: May 18, 2011

Related U.S. Application Data

(60) Provisional application No. 61/375,383, filed on Aug. 20, 2010.

(51) Int. Cl.
*B60L 3/00* (2006.01)
*G01C 21/30* (2006.01)
*G08G 1/123* (2006.01)

(52) U.S. Cl.
USPC .................... 701/21; 701/208; 340/995.19

(58) Field of Classification Search
USPC ............... 701/21, 99, 115, 116, 208; 440/2, 440/53, 84; 123/323, 350, 352, 360, 361, 123/399
See application file for complete search history.

(56) References Cited

U.S. PATENT DOCUMENTS

| | | | |
|---|---|---|---|
| 4,428,052 A | 1/1984 | Robinson et al. | |
| 4,597,069 A | 6/1986 | Milano et al. | |
| 5,172,324 A | 12/1992 | Knight | |
| 5,268,844 A * | 12/1993 | Carver et al. | 701/468 |
| 5,309,408 A | 5/1994 | Bick et al. | |
| 5,362,263 A | 11/1994 | Petty | |
| 5,386,368 A | 1/1995 | Knight | |
| 5,400,300 A | 3/1995 | Bick et al. | |
| 5,546,695 A | 8/1996 | Langer | |
| 5,884,213 A * | 3/1999 | Carlson | 701/21 |
| 6,208,758 B1 * | 3/2001 | Ono et al. | 382/190 |
| 6,256,585 B1 | 7/2001 | Shannon | |
| 6,750,815 B2 | 6/2004 | Michaelson et al. | |
| 6,873,570 B2 * | 3/2005 | Zhu et al. | 367/88 |
| 6,934,608 B2 * | 8/2005 | Qureshi | 701/4 |
| 6,934,657 B1 * | 8/2005 | Carlson et al. | 702/130 |
| 7,124,022 B2 * | 10/2006 | Carmichael et al. | 701/409 |
| 7,209,829 B2 * | 4/2007 | Litvack et al. | 701/533 |
| 7,266,532 B2 * | 9/2007 | Sutton et al. | 706/12 |
| 7,268,703 B1 | 9/2007 | Kabel et al. | |
| 7,313,404 B2 * | 12/2007 | Anderson | 455/456.1 |
| 7,769,504 B2 * | 8/2010 | Kaji | 701/21 |
| 7,940,602 B1 | 5/2011 | Korolenko | |
| 8,296,001 B1 | 10/2012 | Kabel et al. | |
| 2004/0249860 A1 | 12/2004 | Stechschulte et al. | |
| 2006/0089794 A1 * | 4/2006 | DePasqua | 701/208 |
| 2009/0037040 A1 | 2/2009 | Salmon et al. | |
| 2009/0067750 A1 | 3/2009 | Pryszo et al. | |
| 2009/0069962 A1 * | 3/2009 | Aharon et al. | 701/21 |
| 2009/0147623 A1 * | 6/2009 | Betts et al. | 367/88 |
| 2010/0131133 A1 | 5/2010 | Koda et al. | |
| 2011/0054784 A1 | 3/2011 | Wood et al. | |

(Continued)

OTHER PUBLICATIONS

U.S. Appl. No. 13/110,587, filed May 18, 2011, Wood et al.

*Primary Examiner* — Thomas Black
*Assistant Examiner* — Tyler Paige
(74) *Attorney, Agent, or Firm* — Reinhart Boerner Van Deuren P.C.

(57) ABSTRACT

A digital mapping display and related system for fishing, and other applications are provided.

19 Claims, 7 Drawing Sheets

General Illustration of Invention

(56) References Cited

U.S. PATENT DOCUMENTS

2011/0054785 A1* 3/2011 Wood et al. .................. 701/209
2011/0258901 A1 10/2011 Garrett
2012/0015566 A1 1/2012 Salmon
2012/0232719 A1 9/2012 Salmon et al.

* cited by examiner

General Illustration of Invention

General Block Diagram of Invention

Toggle Set Cursor Position to Select Contour

Highlighting Depth

Set Route Starting Point

Set Route Ending Point

Route Set, Preparing Machine Instructions

DIGITAL MAPPING DISPLAY FUNCTIONS FOR A GPS/SONAR UNIT

CROSS-REFERENCES TO RELATED APPLICATIONS

This application claims priority to Provisional Ser. No. 61/375,383 filed Aug. 20, 2010, commonly assigned, and hereby incorporated by reference herein.

BACKGROUND OF THE INVENTION

According to the present invention, techniques for digital mapping are provided. In particular, the present invention provides methods, devices, codes, and systems for displaying selected regions of a body of water and associated areas. More particularly, the present invention provides systems, methods, codes, and devices for selectively highlighting one or part of one bottom contour (or other region) in the chart of a body of water using a display coupled to a GPS (i.e., global position system or sensor) or other visual Display Device. Of course, other embodiments may be provided as well.

Vessel navigation through GPS has evolved from its earlier days in locating the vessel upon a body of water and displaying that location information for a vessel operator to an ability to create user programmed routes to guide the vessel. Conventional GPS allows users to manually create a series of turn points and then connect them together to create a contiguous path for the vessel to follow. Unfortunately, disadvantages exist with conventional GPS. As an example, one disadvantage is that it is cumbersome and, depending on the detail provided by the underlying chart, may not be truly accurate. More importantly, a finite amount of time is often required to create the turn points necessary to generate a desired route, making it difficult to accomplish while the vessel or course is underway. These and other limitations are described throughout the present specification and more particularly below.

From the above, it is seen that techniques for improving vessel navigation using GPS are highly desirable.

SUMMARY OF THE INVENTION

According to the present invention, techniques for digital mapping are provided. In particular, the present invention provides methods, codes, devices, and systems for displaying selected regions of a body of water and associated areas. More particularly, the present invention provides systems, methods, codes, and devices for selectively highlighting one or part of one bottom (or other) contour in the chart of a body of water using a display coupled to a GPS or other visual Display Device. The selected bottom contour or part thereof to then be converted into a machine readable code and outputted, as one or more indications associated with the contour lines on the display, in machine readable code to a vessel control device. As an example, ProMap Technologies, Inc., dba; LakeMaster Lake Maps has developed a Chart Library and API that allows GPS manufacturers to embed the API into their OS and thus display proprietary LakeMaster Digital Charts. These LakeMaster Digital Charts reside on a secure SD media card in a format initially compatible with certain GPS display devices currently available. By connecting the GPS device to a vessel control device, the vessel can automatically be directed along selected bottom contour lines without the necessity of creating independent routing information for the vessel control device. Of course, one or ordinary skill in the art would recognize other variations, modifications, and alternatives.

As background, conventional route formation deals with creating a route from a first starting point to an end point. Between these points, routes are created. These routes, however, cannot traverse along a particular contour, which is often desirable for vessel or fishing techniques. In a specific embodiment, the present method and system provides a way of navigating along a portion of a contour, which has no end points. Further details of the present method and system can be found throughout the present specification and more particularly below.

In a specific embodiment, the present method and system overcomes one or more of the limitations by providing a method and system for a rapid, easily applied automatic way in creating a navigable route from complex bottom contour or contour information in a language understandable by and for transmission to various vessel control devices, which are configured to navigate a vessel. Further details of the present method and system can be found throughout the present specification and more particularly below.

As an example, using a Chart Library and API that allows GPS manufacturers to embed the API into their respective operating system, or commonly called OS, and thus display proprietary LakeMaster Digital Charts containing detailed bottom contours of a water body, the cartographic data included in Chart Library are encoded to allow the user to select and automatically convert a bottom contour or part thereof to a route in machine readable code that can be used to direct vessel control devices commonly available for use in commercial and recreational vessels of all types.

In a specific embodiment, the present invention provides a method for selecting lake bottom contour line(s) of a body of water from a digital or raster map of lake bottom contours displayed on a GPS or other display device and converting them to a machine readable code to allow a vessel control device (Auto Pilot) to navigate a vessel along the selected contour(s). The method includes providing at least one chart out of a plurality of charts of one or more regions of a body of water. In a specific embodiment, the chart comprises a depiction of a plurality of bottom contour lines of constant depth below the surface or of other defined contiguous regions of the one or more regions of the body of water. Preferably, the chart is configured to allow selection of one or more such contour lines by a user. The method also includes selecting at least one contour or part of a contour to be highlighted simultaneously with the chart on the display and processing information associated with the selected contour with information from the chart to convert one or more lines to machine readable code. The method includes outputting one or more indications associated with the one or more contour lines on the display in machine readable code to a vessel control device. Optionally, the outputting of the one or more indications is provided simultaneously with the chart to display the one or more indications with the chart together.

In a specific embodiment, the method has various indications. That is, one or more indications are associated with one or more broken contour lines, one or more flashing contour lines, one or more series of symbols, or other visual indications for a display. In a specific embodiment, the one or more indications are associated with one or more contour lines differentiated from the remaining contour lines or wherein the one or more indications are associated with one or more shaded regions differentiated from the remaining regions, or wherein the one or more indications are associated with one or more colored regions differentiated from the remaining regions.

In other embodiments, the method includes a chart, which is displayed and can also be stored in computer memory in computer readable form. In a specific embodiment, the chart comprises information associated with the plurality of bottom depths. In a specific embodiment, the chart is one of a multiple or a plurality of charts provided in a library, which is stored on a media card. In a preferred embodiment, the plurality of charts being in respective raster forms, but can be other combinations. In a specific embodiment, the chart comprises information associated with the plurality of bottom depths. In a specific embodiment, the chart is from a plurality of charts provided in a library stored on a media card. In a preferred embodiment, the plurality of charts being in respective vector forms. In a specific embodiment, the chart includes a structure indication representative of a change in composition of a bottom region of the body of water. In other embodiments, the chart includes a structure indication representative of an edge of a weed bed on a bottom region of the body of water.

In one or more embodiments, the method includes optional techniques for inputting depth information. In a specific embodiment, the method includes selecting of the depth contour comprises at least inputting the depth through a user interface provided on the GPS or other display device. The method also includes moving a slide bar on a user interface provided on the GPS or other display device to initiate input of the depth information. The depth information can be provided by using a key pad or toggle on the GPS or other display device, selecting and highlighting a depth contour on the GPS or other display device, inputting the depth through a user interface to allow one or more voice commands, or inputting the depth through a user interface provided through a key pad or toggle that is separate from the GPS or other display device. Of course, there can be other variations, modifications, and alternatives.

In an alternative specific embodiment, the present method includes selecting of a bottom composition contour, which is navigated by a vessel. The selecting including at least inputting the description through a preset user menu interface provided on the GPS or other display device, moving a slide bar on a user interface provided on the GPS or other display device, using a key pad or toggle on the GPS or other display device, inputting the desired bottom composition by selecting and highlighting a bottom composition contour on the GPS or other display device, inputting the bottom composition contour through a user interface to allow one or more voice commands, or inputting the bottom composition contour through a user interface provided through a key pad or toggle separate from the GPS or other display device.

Still further, the present method includes selecting of the weed bed edge contour, which is navigated by a vessel. The method includes at least inputting the description through a preset user menu interface provided on the GPS or other display device, moving a slide bar on a user interface provided on the GPS or other display device, using a key pad or toggle on the GPS or other display device, inputting the desired weed bed edge contour by selecting and highlighting a weed bed edge contour on the GPS or other display device, inputting the weed bed edge contour through a user interface to allow one or more voice commands, or inputting the weed bed edge contour through a user interface provided through a key pad or toggle separate from the GPS or other display device These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

Many benefits are achieved by way of the present invention over conventional techniques. In summary, there exists a need for the ability to automatically create a navigable route along a contour line depicted on a GPS or other visual display and convert that route to a machine readable set of instructions that can direct the course of the vessel along a contour rather than two end points. More importantly, the charts, codes, programs and systems that currently exist have limited resources available for processing and converting complex chart bottom contour information into usable machine readable codes for vessel control devices to navigate along a contour. By way of navigating along a contour, a fishing vessel can be within a vicinity of a desirable depth rather than traversing among various depths and contours, which may be undesirable. It is necessary to have systems, methods and devices that accomplish the desired result using current state of the art devices. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

Figure 1:
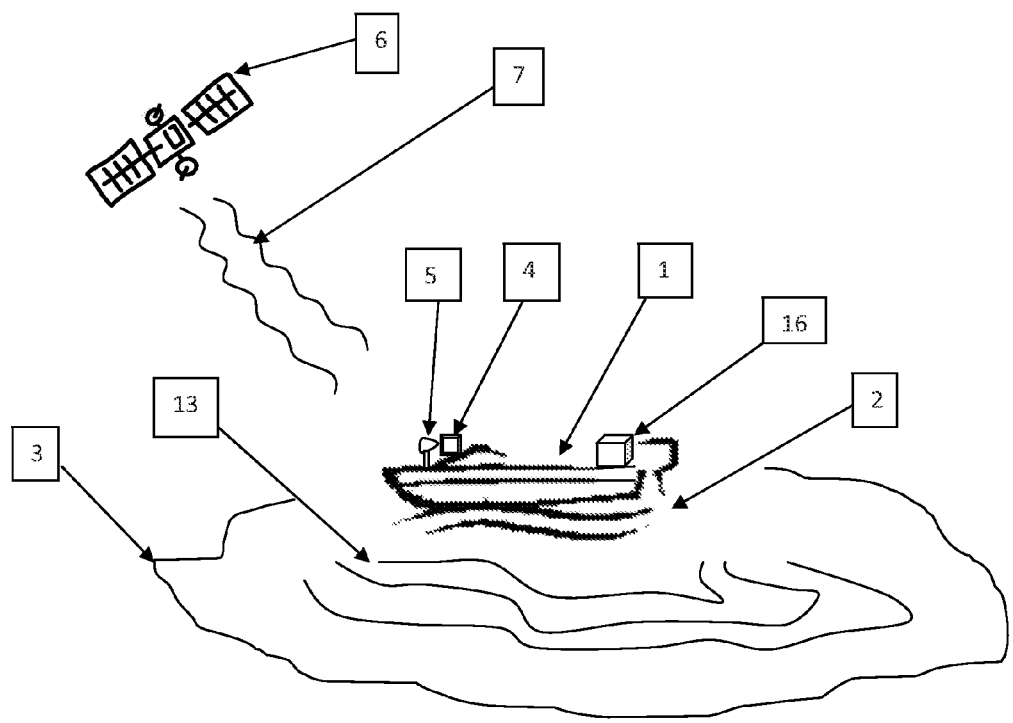
FIG. 1 is a simplified diagram of a system according to an embodiment of the present invention.

According to the present invention, techniques for digital mapping are provided. More particularly, the present invention provides methods, devices, and systems for selecting lake bottom contour lines of a body of water from a digital or raster map of the lake bottom contours and converting them to a machine readable code to allow a vessel control device (Auto Pilot) to navigate a vessel along the selected contour(s). As an example, ProMap Technologies, Inc., dba; LakeMaster®, has developed a Chart Library API that allows GPS manufacturers to embed the API into their OS and thus make LakeMaster bottom contour maps, proprietary to LakeMaster, accessible from the GPS unit. This GPS unit can be connected to an Auto Pilot device allowing the operator to use information from the LakeMaster lake bottom contour maps to allow the Auto Pilot device to guide a vessel along a selected route created from the lake bottom contours. Of course, there can be other variations, modifications, and alternatives.

The functionality of the present Chart Library API coupled with the ability to convert contour line information into machine readable codes for Auto Pilot devices is novel and unique GPS plotter technology as applied to the fishing and boating industry according to one or more embodiments. The functionality is provided to the API and is thus applicable to any unit that can access the API. This mapping display function of the API is more particularly described below.

To assist the reader in understand the following description, the following definitions have been provided. Of course, these definitions are not intended to be limiting and are merely examples.

"API" means application programming interface.

"Chart Library" means a collection of subroutines and/or routines that contain code, images and data to provide services to independent programs.

"Contour Line" means one or more lines depicting a contiguous or semi-contiguous area of the bottom of a water body being at the same depth below the surface or one or more lines depicting a transition between two differing areas of bottom composition, bottom hardness, weed growth or current flow. "A contour line (also isoline or isarithm) of a function of two variables is a curve along which the function has a constant value." See, http://en.wikipedia.org/wiki/Contour_line, as an example.

"GPS" means Global Positioning Sensor capable of providing a visual representation of geographic location coupled with a map of the surrounding area.

"GPS/Sonar Combination Unit" (Combo Unit) means one or more configurations of visual displays capable of displaying inputs from GPS and Sonar units on a single integrated display.

"GPS Display Device" means a visual display device in one or more configurations of GPS or Combo unit.

"Map Media Cards" means any form of electronic media mass storage device or media card capable of storing digital information and allowing access to such information by a digital processor.

"Human Interface" means any method by which a human user is able to input specific values (data) into a GPS Display Device to dynamically change the appearance of the visual display in a predetermined manner.

"Shaded" means cross-hatch, dotted, or other fill methods for regions and any and all forms of line or shading depiction.

"Raster" and "Vector" relate to techniques of processing data for display on the GPS, or in any GIS environment. As an example, raster format basically stores a set of images that are "pinned" to a geographic location on the earth. When the GPS location data is input into the GPS software, the image is called up and displayed on the screen. Vector format has discrete points individually coded with geographic location information. That information is output to a program which literally draws the geographic image and then places it on a screen.

"Vessel Control Device or Auto Pilot" means any form of vessel navigation control device capable of receiving and executing machine code instructions from a GPS Processor, Combo Unit Processor or computer central processor.

"Visual Display Device" means a computer screen, liquid crystal display or other means of electronically viewing images.

As used herein, the above definitions are merely examples. There can be other variations, modifications, and alternatives and meanings consistent with those interpretations known in the art.

Figure 2:
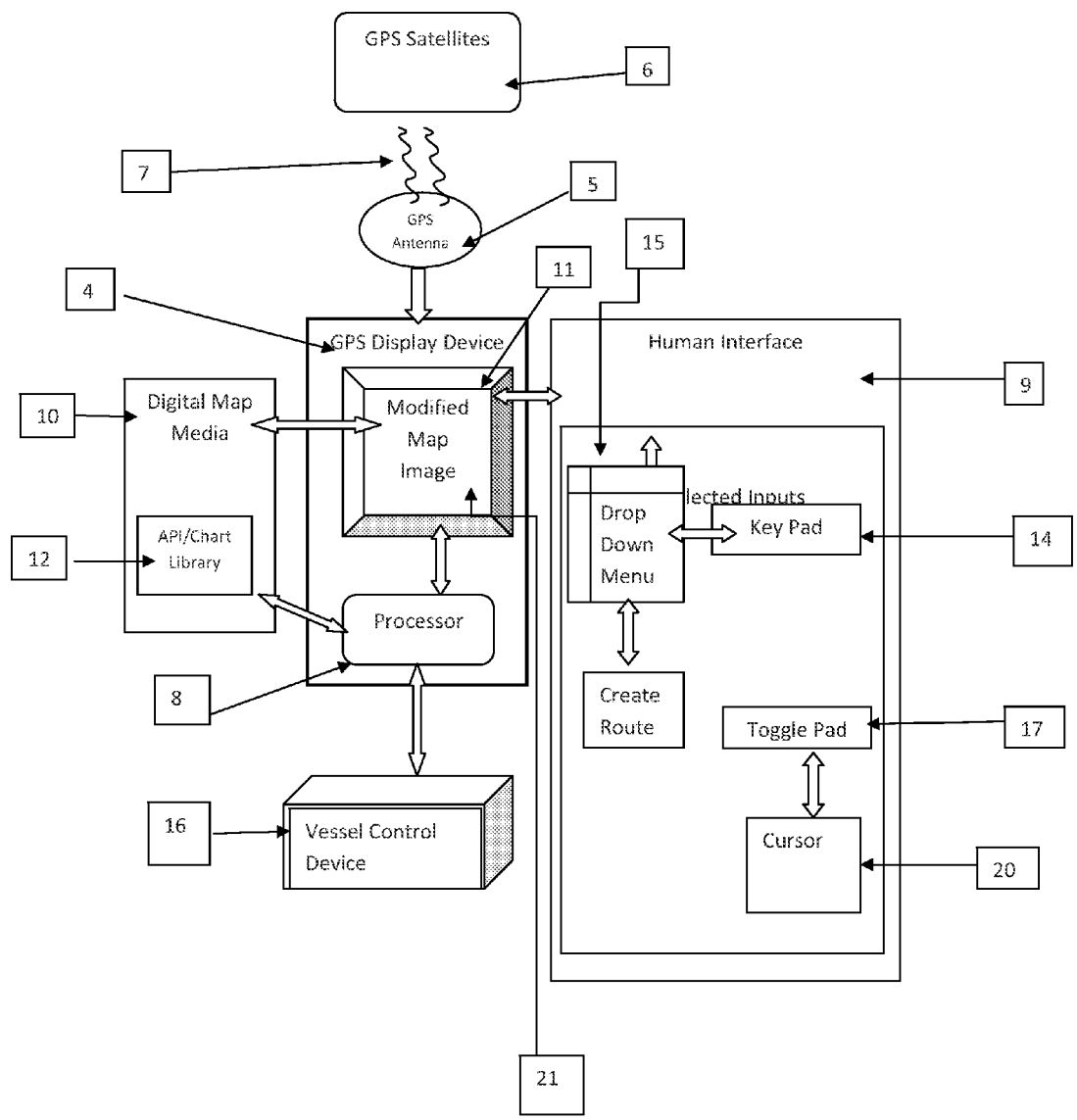
FIG. 2 is a simplified block diagram of a system according to an embodiment of the present invention.
Figure 3:
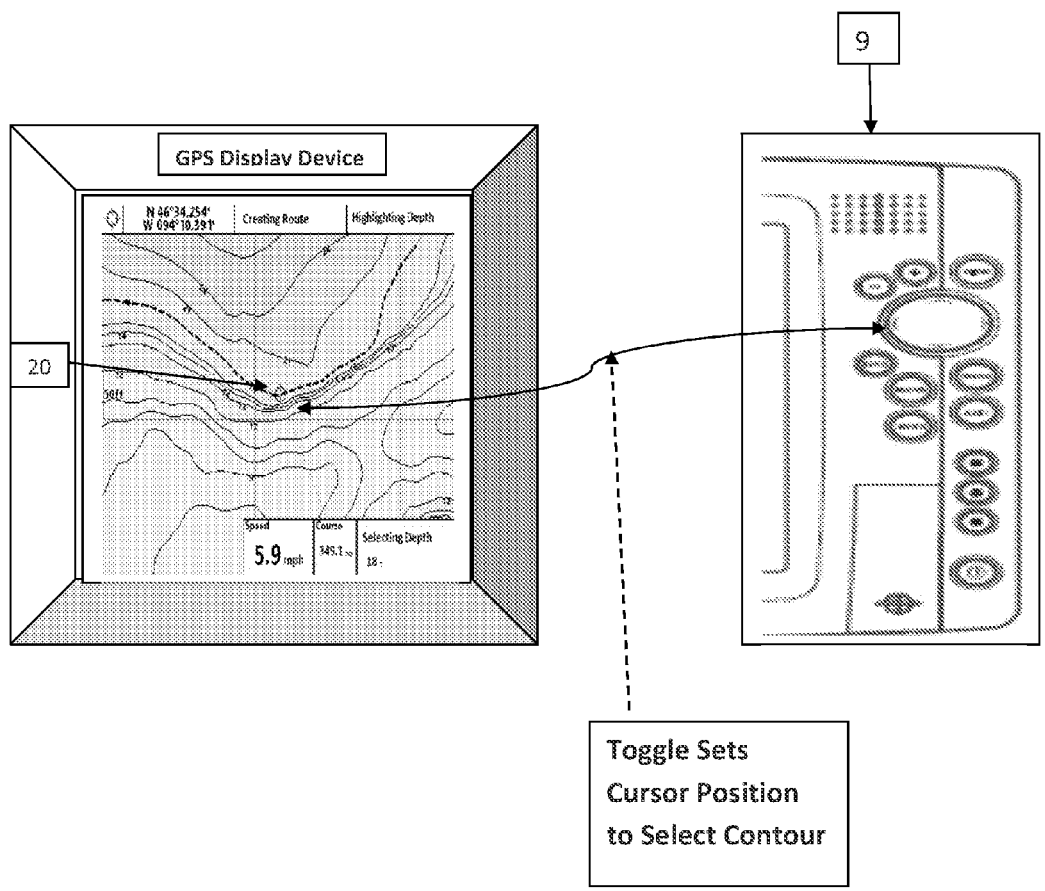
FIG. 3 is a simplified diagram illustrating a method for a toggle set cursor position to a select contour position according to an embodiment of the present invention.
Figure 4:
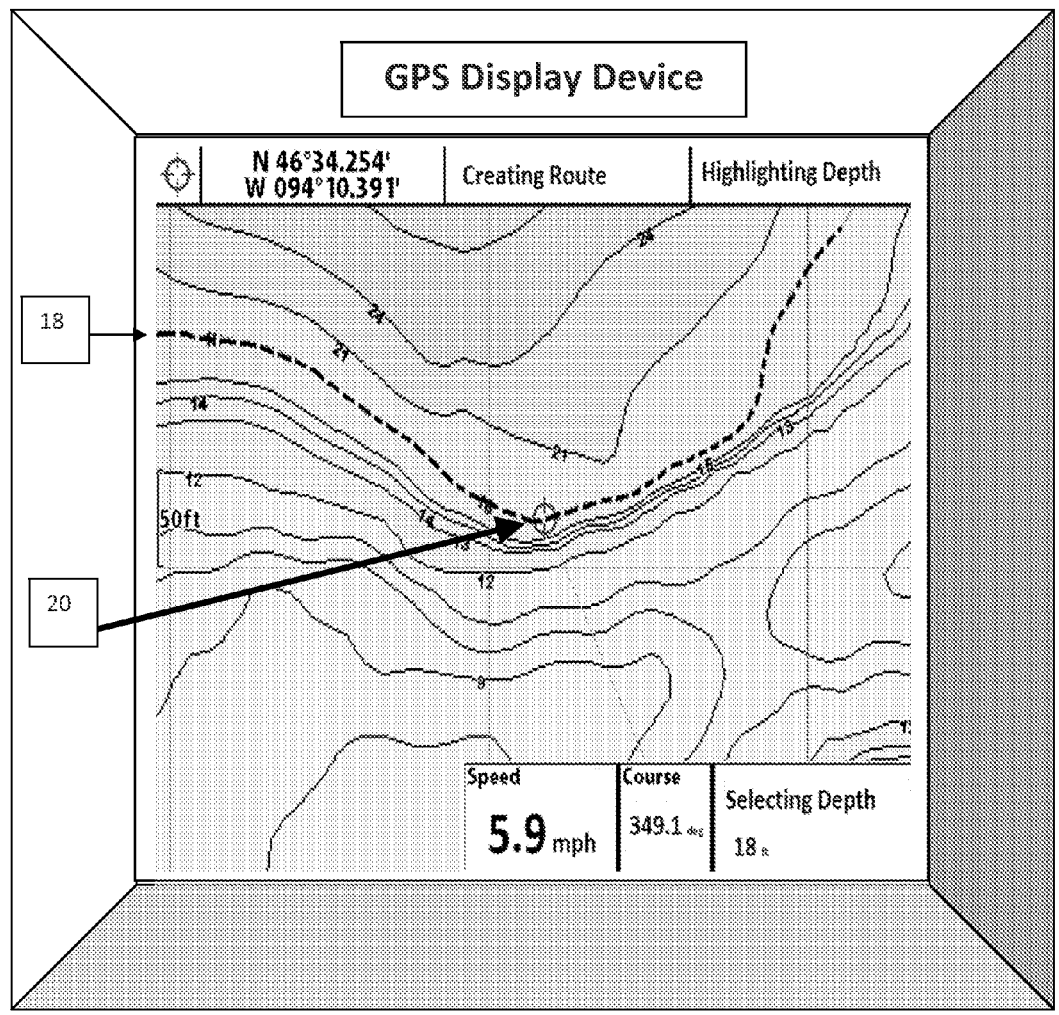
FIG. 4 is a simplified diagram illustrating a method for highlighting depth according to an embodiment of the present invention.
Figure 5:
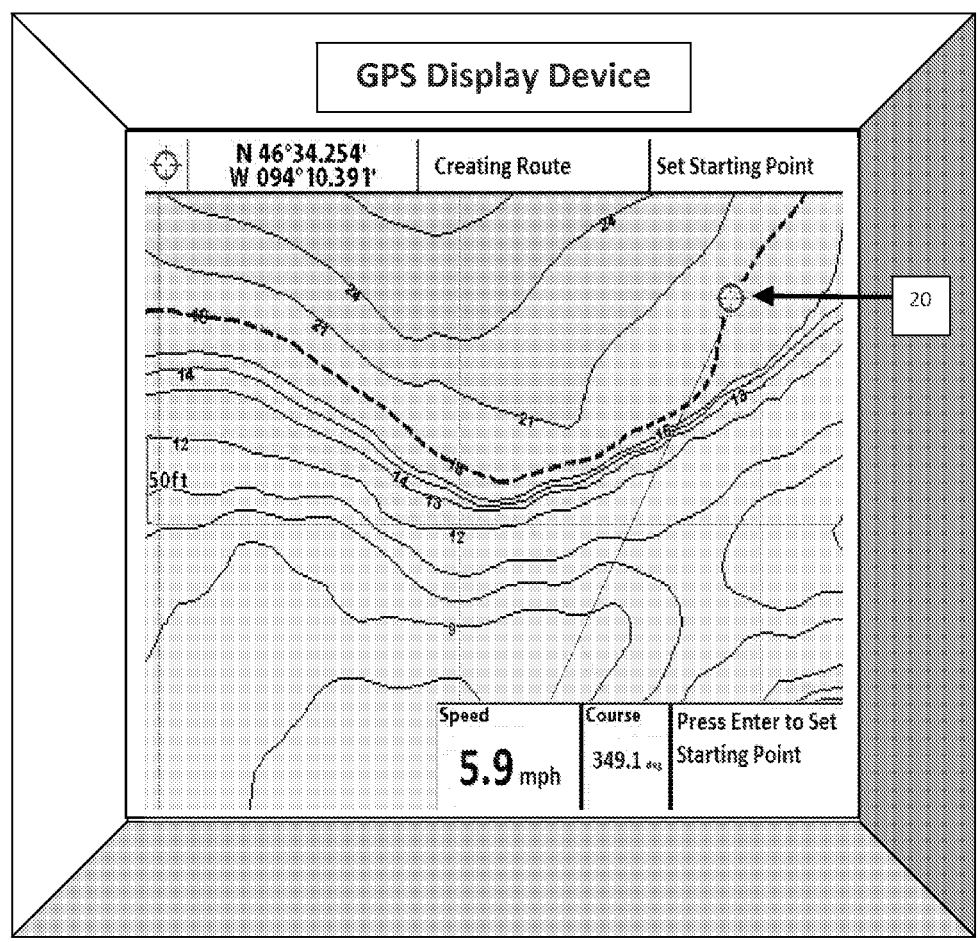
FIG. 5 is a simplified diagram illustrating a method to set a route starting point according to an embodiment of the present invention.
Figure 6:
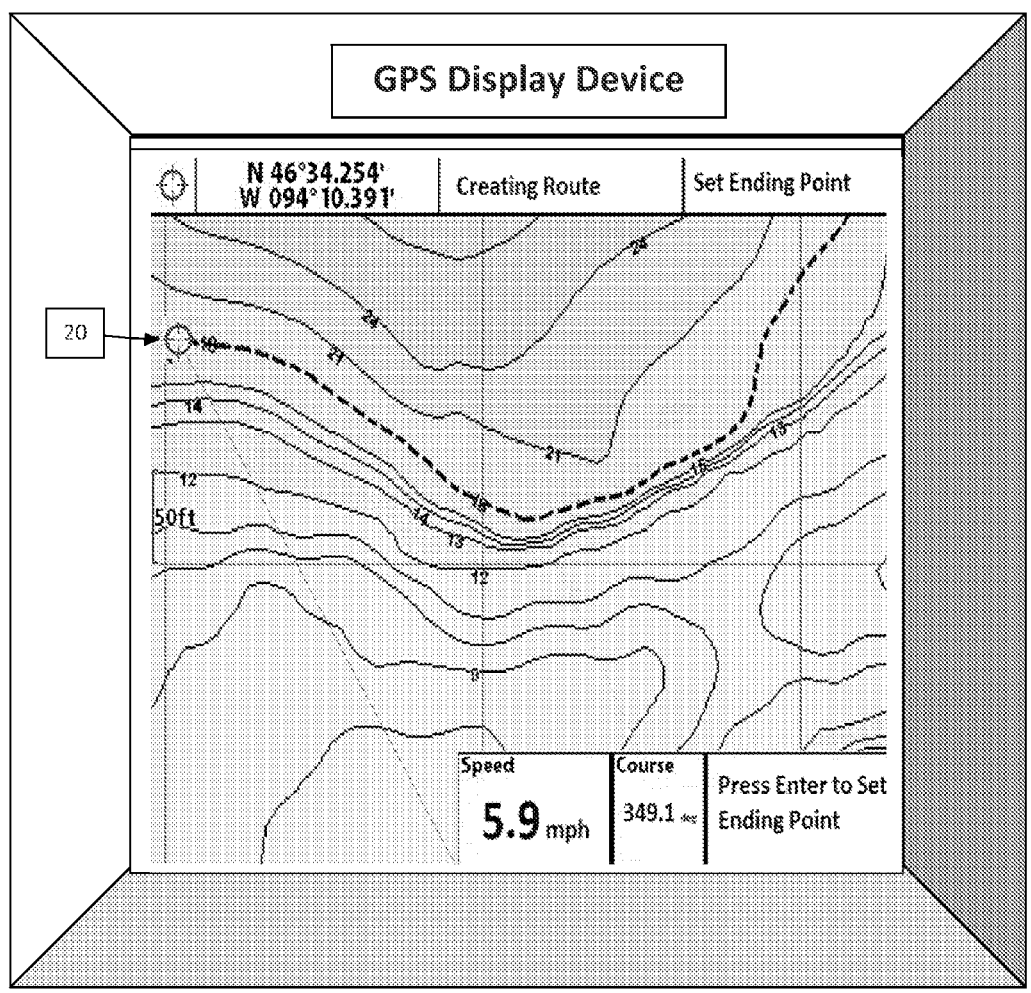
FIG. 6 is a simplified diagram illustrating a method to set a route ending point according to an embodiment of the present invention.
Figure 7:
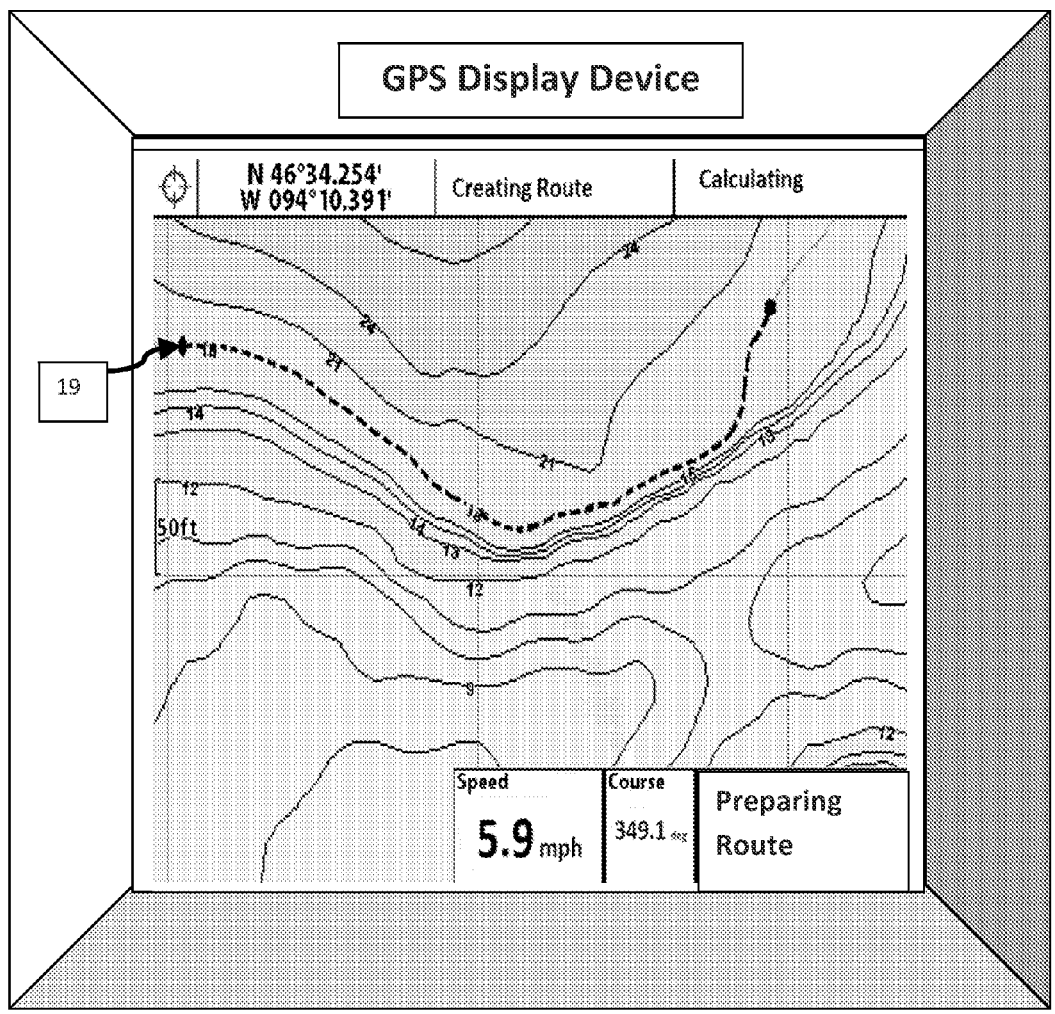
FIG. 7 is a simplified diagram illustrating a method for a route set, preparing machine instructions process according to an embodiment of the present invention.

In a specific embodiment, the present method and system can be described in reference to FIGS. 1 through 7 and the brief descriptions below for each reference numeral in the Figures. Of course, there can be other variations, modifications, and alternatives.

1 watercraft
2 water surface
3 Water Body
4 GPS Display device
5 GPS antenna
6 GPS satellites
7 GPS signal
8 Processor
9 Human Interface
10 Digital map media
11 Display Area
12 API/Chart Library
13 Bottom Contours
14 Key Pad
15 Drop Down menu
16 Vessel Control Device—Auto Pilot
17 toggle pad
18 Highlighted Contour
19 Final Route
20 Cursor
21 Modified Map Image Further details of the present method and system can be found throughout the present specification and more particularly below.

Referring to FIGS. 1 thru 7 again, a vessel, shown as a watercraft 1, on a surface 2 of a body of water 3, employs a GPS Display Device 4 mounted on the watercraft connected to a GPS antenna 5. In a specific embodiment, the watercraft could be any suitable vessel or the like, which can be provided on the surface of the body of water. The water can be from a river, lake, ocean, pond, or the like. Alternatively, the body of water can be a bay, a river, a reservoir, an impoundment, a slough, or a stream, and combinations thereof. In a specific embodiment, the GPS Display Device can be a GPS chart plotter or separate Liquid Crystal Display Monitor. As an example, the GPS Display Device is a Humminbird combo unit from a manufacturer such as Humminbird of 678 Humminbird Lane in Eufaula, Ala. 36027, but can be others. Of course, there can be other variations, modifications, and alternatives.

The processor 8 repetitively processes the signals from the satellites 6 to determine the position of the watercraft 1. The processor 8, using this position information determines the correct visual map image to retrieve from the API/Chart Library 12 on the Digital Map Media Card 10 to display in the visual display area 11. That is, the processor associates the position information, which has coordinates, and relates such information to a certain visual map image in digital form from a plurality of map images in at least one embodiment. As an example, the processor is a Graphics controller or preprogrammed micro processor, but can be others. In a specific embodiment, the term processor is used broadly to include hardware, firmware, and software embodiments, among combinations, and the like. The processor then retrieves any user pre-sets inputted through the Human Interface 9 to modify the map image retrieved from the Map Media Card 10 to create a modified map image from the original map image. The processor 8 then places the modified map image 21 in the visual display area 11. The User then highlights a specific bottom contour 13 from which to create a route.

As an example, the User employs the Human User Interface 9 to input a specific depth value, e.g. 18 feet by to the processor 8, using a specific input from the toggle pad 17 to position the cursor 20 on the bottom contour the User wishes the vessel to follow, the User then uses the Drop Down Menu 15 to indicate the Processor 8 is to create a route. The Processor modifies the imbedded codes in the visual image previously retrieved from the Chart Library. The modified codes cause the processor 8 to then highlight the specified 18 foot depth by changing the graphic representation of the 18 foot contour line. The Processor 8 then places the modified map showing the specific highlighted contour in the Visual Display Area 11. The User then determines whether to use the entire contour or a part of the contour. To use only a part of the contour, the User uses the Human Interface 9 to move the cursor 20 over the starting point of the route to be created and uses the key pad to "lock in" the start position. The User then moves the cursor 20 to the stop point of the route on the selected contour and uses the key pad to "lock in" the stop point of the route to be created. The Processor 8 then retrieves the appropriate code from the designated section of the bottom contour 13 and converts it to a machine readable set of instructions. These instructions are then retained by the Processor 8 and made available to the Vessel Control Device 16. Of course the visual display area can alternatively display the Modified Map Image 21 for any location the user may choose to determine allowing the User to create specific routes in areas away from the vessel's current position. There can be other variations, modifications, or alternatives.

EXAMPLE

In a specific embodiment, the present invention provides a method for selecting lake bottom contour line(s) of a body of water from a digital or raster map of lake bottom contours displayed on a GPS or other display device and converting them to a machine readable code to allow a vessel control device (Auto Pilot) to navigate a vessel along the selected contour(s). An example of specific sequence of steps and computer codes and/or instructions is shown below in a step by step sequence.

1. Provide a plurality of charts from a Chart Library (e.g., media stick, hard memory, fixed memory, database);
2. Provide at least one chart out (e.g., vector and/or raster) of the plurality of charts of one or more regions of a body of water;
3. Select the chart and display the chart on a display or GPS based on the vessel's current position or by selecting a different part of the chart away from the vessel, while navigating a vessel which is coupled the display or GPS;
4. Select at least one contour to be highlighted within the chart on the display;
5. Process the information associated with the selected contour using specific attributes imbedded within the chart display to create a course along which the vessel is to be navigated;
6. Optionally, select a point of beginning and ending point if only a portion of the course created is to be employed;
7. Convert the created course to one or more lines of machine readable code within the GPS or other device;
8. Optionally, output one or more indications associated with the one or more contour lines on the display with the geographic region of the chart;
9. Transfer the machine readable code to a vessel control device, coupled to a navigation system, which may also include a trolling motor, including rudder;
10. Engage the vessel control device to navigate the vessel along the selected contour line using the course instruction code(s); and
11. Perform other steps as desired.

As shown, the present method includes a sequence of steps and/or processes that allow for vessel navigation by way of selecting a portion of a contour line on a map or chart, among other features. Depending upon the embodiments, any of the steps may be combined or separated. Additional steps may be added or certain steps may be removed. Of course, there can be other variations, modifications, and alternatives. Further methods according to embodiments of the present invention are described below.

An alternative method according to the present invention may be identified as follows.

1. Provide at least one chart (e.g., vector and/or raster) out of the plurality of charts of one or more regions of a body of water containing intelligent pixels containing attributes discernable by raster intercept;
2. While navigating a vessel which is coupled to the display or GPS, User selects current position or select cursor position to display a different part of the chart away from the vessel position;
3. If cursor position equals current vessel position, display raster image of current position associated with the zoom level and detail resident on the display or GPS, if not then display raster image at cursor coordinate location associated with the zoom level and detail resident on the display or GPS;
4. User inputs desired contour along which to create course, (e.g. depth, bottom content, weed edge)
5. If user selects depth from drop down menu or keypad;
6. Processor evaluate intelligent pixels in current display;
7. For each pixel where depth attribute equals the User input depth, add pixel to highlight memory buffer;
8. When all pixels in current display are evaluated, set color attribute of pixels in highlight memory buffer to "highlight color";
9. Output highlight memory buffer to Display or GPS;
10. User set cursor at starting point on highlighted contour;
11. Evaluate all pixels in highlight memory buffer to find pixel with location attribute equal to cursor location;
12. Place start pixel in course memory buffer;
13. User set cursor at ending point on highlighted contour;
14. Evaluate all pixels in highlight contour memory buffer to find pixel with location attribute equal to cursor location;
15. Place ending point pixel in course memory buffer;
16. Evaluate starting and ending pixel to establish horizontal spatial bounds of course along highlighted contour;
17. Evaluate pixels in highlight contour memory buffer and place all pixels within horizontal course spatial boundaries in the course memory buffer;
18. Evaluate all pixels in the course memory buffer to place them in spatially ordered sequence from start pixel to end pixel;
19. Evaluate the azimuth between each pixel sequentially in course memory buffer to determine if azimuth changes between successive pixels;
20. For each azimuth between pixels that represents a change from the previous azimuth between pixels, place the current pixel and the pixel immediately preceding the azimuth change in the vessel control buffer;

21. When all azimuths between pixels in the course memory buffer have been evaluated, lookup vessel control device instruction format;
22. Choose correct world coordinate file;
23. For each intelligent pixel in the course buffer, convert each intelligent pixel's location attribute to the correct world file coordinate;
24. Open communications with Vessel Control device;
25. Engage the vessel control device to navigate the vessel along the selected contour line using the converted world coordinate file; and
26. Perform other steps, as desired.

As shown, the present method includes a sequence of steps and/or processes that allow for vessel navigation by way of selecting a portion of a contour line on a map or chart, among other features. Depending upon the embodiments, any of the steps may be combined or separated. Additional steps may be added or certain steps may be removed. Of course, there can be other variations, modifications, and alternatives. Further methods according to embodiments of the present invention are described below.

The functionality of the present Chart Library API coupled with the ability to convert contour line information into machine readable codes for Auto Pilot devices is novel and unique GPS plotter technology as applied to the fishing and boating industry according to one or more embodiments. The functionality is provided to the API and is thus applicable to any external navigation request from an auto-pilot source that can access the API. This mapping display function of the API is more particularly described below.

The function and graphic primitives that allow this function to be performed on a GPS screen are resident in one or more codes. The GPS manufacturer (in this case, as an example, Humminbird) provides the Operating System Menu Options that allow this function to be invoked through a drop down screen display window allowing the user to select all or part of a particular bottom contour line or combination of different contour lines for conversion to machine readable codes accessible by an Auto Pilot device and propulsion source. The selection is accomplished by inputting a desired depth through a screen slide bar, digital number pad or like data entry method.

When a specific depth contour line is be selected and highlighted, the API extracts an attributed image of the selected contour line from the map contained in a Chart Library containing various lake bottom contour maps. In a specific embodiment, the chart comprises at least information selected from a hardness of the bottom of the water body, a content of the bottom of the water body, a weed content of the water body, or a current present in the water body. The depth contour line is a series of GPS or spatial coordinates at a specific depth. The API then uses the attributed image to create a series of machine readable coordinates which can be accessed and utilized by an Auto Pilot device.

Any depth contour line displayed by the GPS device can be selected for conversion to machine readable coordinates by the API. Of course, there can be other variations, modifications, and alternatives.

In a specific embodiment, the present chart has indication that includes variations, modifications, and alternatives. That is, one or more indications are associated with one or more broken contour lines, one or more flashing contour lines, one or more series of symbols, or other visual indications for a display. In a specific embodiment, the one or more indications are associated with one or more contour lines differentiated from the remaining contour lines or wherein the one or more indications are associated with one or more shaded regions differentiated from the remaining regions, or wherein the one or more indications are associated with one or more colored regions differentiated from the remaining regions.

In a specific embodiment, the present system and method allow for the creation and export of tracking routes from a complex intelligent image or vector database formed from a variety of inputs. Further details of aspects of the invention are provided throughout the present specification and more particularly below.

In a specific embodiment, a tracking route is a sequenced set of coordinates suitably spaced with a starting and end point and in the proper format and geographic projection for directional use with an intelligent electronic trolling motor or other vessel control device. The system and method generate these routes by tracking edges from the intelligent image or from line segments of the vector database.

In a specific embodiment, an edge is a linear sequence of image points of constant value and along which the values on opposite sides of the line are different. For example, in a simple lake contour map the contour lines represent edges along which the lake depth is constant and changes from one side of the contour to the other. The images from which these edges are derived may be simple depth images or complex images derived from a variety of sources.

In a specific embodiment, a line segment of the vector database consists of points of constant value and along which the values on opposite sides of the line segment are different. For example, in a simple lake contour map the contour lines represent line segments along which the lake depth is constant and changes from one side of the contour to the other. The vector database from which these line segments are derived may be simple depth points or complex lines derived from a variety of sources, which are examples. Such sources include:
1. Intelligent image based depth maps in which depth information is encoded directly into the image.
2. Auto correcting vector based contours in which the depth information is encoded into sequenced points which are automatically corrected for changes in lake levels based on user selected offset values.
3. Lake substrate data representing the type of lake bottom (rock, sand, mud) and the presence of vegetation
4. Time of day and day of year
5. Water clarity
6. User-input weather data (wind speed and cloud cover).

These images or vector line segments are generated based on combinations of the above data from user input and may simply represent lake depth or combined data such as depth and light intensity or depth and vegetation. The user then selects a start and end point for the route generation and the system tracks the desired edge and displays the track on the screen for user verification. The user can then direct the system to transfer the tracking route to the vessel control device by converting the image or line segment coordinates to the world coordinates and format required by the vessel control device.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for selecting at least one contour line of a body of water from a map of lake bottom contours displayed on a display device and converting the contour line into a machine readable code to instruct a vessel control device (Auto Pilot) to navigate a vessel along the selected contour(s), the method comprising:

providing at least one chart out of a plurality of charts of one or more regions of a body of water, the chart comprising a depiction of a plurality of bottom contour lines each of which is a constant depth below the surface, the chart being configured to allow selection of a contour;

selecting at least one contour or portion of a contour to be highlighted simultaneously with the chart on the display, the selecting being free from determining an end point of the contour and the contour being free from the end point;

processing contour information associated with the selected contour with chart information from the chart to convert the contour information into a machine readable code;

outputting one or more indications associated with the selected contour or portion of the contour on the display;

outputting the machine readable code to a vessel control device; and instructing the vessel control device using the machine readable code to move the vessel along a path representative of the selected contour.

2. The method of claim 1 wherein the one or more indications are associated with one or more broken contour lines, one or more flashing contour lines, or one or more series of symbols.

3. The method of claim 1 wherein the one or more indications are associated with one or more contour lines differentiated from the remaining contour lines or wherein the one or more indications are associated with one or more shaded regions differentiated from the remaining regions, or wherein the one or more indications are associated with one or more colored regions differentiated from the remaining regions.

4. The method of claim 1 wherein the chart comprises information associated with the plurality of bottom depths; wherein the chart is from a plurality of charts provided in a library, the library is provided on a media card, the plurality of charts being in respective raster forms.

5. The method of claim 1 wherein the chart comprises information associated with the plurality of bottom depths; wherein the chart is from one of a plurality of charts provided in a library, the library is provided on a media card, the plurality of charts being in respective vector forms.

6. The method of claim 1 wherein the chart comprises a structure indication, the structure indication is a change in composition of a bottom region of the body of water.

7. The method of claim 1 wherein the chart comprises a structure indication, the structure indication is an edge of a weed bed on a bottom region of the body of water.

8. The method of claim 1 wherein the selecting of the contour line comprises at least inputting depth information through a user interface provided on the display device.

9. The method of claim 1 further comprising moving a slide bar on a user interface provided on the display device, wherein the inputting depth information is selected from a process including at least using a key pad or toggle on the display device, selecting and highlighting a depth contour on the display device, using one or more voice commands to input the depth information, or using a user graphical interface provided through a key pad or toggle that is separate from display device.

10. The method of claim 1 wherein at least one contour is a bottom composition contour, and wherein the selecting comprises at least inputting a description of the bottom composition through a preset user menu interface provided on the display device.

11. The method of claim 1 wherein at least one contour is a weed bed edge contour, and wherein the selecting comprises at least inputting a description through a preset user menu interface provided on the display device.

12. The method of claim 1 wherein the body of water is selected from one of a lake, an ocean, a bay, a river, a reservoir, an impoundment, a pond, or a stream.

13. The method of claim 1 wherein the chart comprises at least information selected from a hardness of the bottom of the water body, a content of the bottom of the water body, a weed content of the water body, or a current present in the water body.

14. A system for selecting at least one contour of a body of water from a map of lake bottom contours displayed on a display device and converting the contour into a machine readable code to instruct a vessel control device (Auto Pilot) to navigate a vessel along the selected contour(s), the system comprising:

at least one chart capable of being displayed on a display device, the chart being from a plurality of charts of one or more regions of a body of water, the chart comprising a depiction of a plurality of bottom contour lines each of which is of constant depth below the surface or of other defined contiguous regions of the one or more regions of the body of water, the chart being configured to allow selection of a contour or a portion of a contour;

one or more codes directed to receiving a selection of at least the one contour or portion of the contour;

one or more codes directed to highlighting the one contour or portion of the contour simultaneously with the chart on the display, the contour being free from an end point;

one or more codes directed to processing contour information associated with the selected contour with chart information from the chart to convert the contour information associated with the contour to a machine readable code; and one or more codes directed to outputting the machine readable code to a vessel control device.

15. The system of claim 14 wherein the system comprises a computer readable medium for the one or more codes.

16. The system of claim 14 wherein machine readable code comprises a plurality of instructions.

17. The system of claim 14 wherein the contour information is change in depth; and wherein the chart information is a geographic region of a body of water.

18. The method of claim 1, wherein selecting at least one contour or portion of a contour to be highlighted simultaneously with the chart on the display comprises either touching the contour to be selected, or by using a mouse to position a cursor on the contour to be selected and clicking a button on the mouse.

19. The system of claim 14, wherein the one or more codes, directed to receiving a selection of at least the one contour or portion of the contour, are configured to select the at least one contour or portion of the contour by either touching the contour to be selected, or by using a mouse to position a cursor on the contour to be selected and clicking a button on the mouse.

* * * * *